United States Patent [19]

Brander et al.

[11] 4,017,060
[45] Apr. 12, 1977

[54] TUNED VIBRATORY FEEDERS

[75] Inventors: James Edward Brander; John David Davies, both of Strathfield, Australia

[73] Assignee: International Combustion Australia Limited, Australia

[22] Filed: May 28, 1976

[21] Appl. No.: 690,741

Related U.S. Application Data

[63] Continuation-in-part of Ser. No. 530,472, Dec. 6, 1974, abandoned, which is a continuation-in-part of Ser. No. 308,877, Nov. 22, 1972, abandoned.

[30] Foreign Application Priority Data

Dec. 9, 1971  Australia ............................ 7314/71

[52] U.S. Cl. .................................... 259/1 R; 74/61
[51] Int. Cl.² ................. F16H 33/00; B65G 27/18; B01F 11/00
[58] Field of Search ................. 259/1 R, 72; 74/61; 198/220 R, 220 CA, 220 DB, 220 BA; 209/366.5, 367

[56] References Cited

UNITED STATES PATENTS

| | | | |
|---|---|---|---|
| 2,258,059 | 10/1941 | Kessler | 74/61 |
| 2,512,120 | 6/1950 | Strain | 74/61 |
| 3,004,389 | 10/1961 | Muller | 74/61 |
| 3,342,075 | 9/1967 | Lowe | 74/61 |
| 3,407,670 | 10/1968 | Venanzetti | 259/1 R |
| 3,498,384 | | Ogura | 74/61 |
| 3,583,246 | 6/1971 | Stahle | 74/61 |
| 3,920,222 | 11/1975 | Brander | 259/1 R |

*Primary Examiner*—Robert W. Jenkins
*Attorney, Agent, or Firm*—Ladas, Parry, Von Gehr, Goldsmith & Deschamps

[57] ABSTRACT

A vibratory feeder, conveyor, separator, screen, or other vibratory equipment used in materials handling and related fields of the tuned two mass type in which one mass is an imbalance generator of the type using eccentric weights on a rotating shaft uses helical coil springs for coupling the imbalance generator to the trough or the like without clamping of the ends of the springs or constraining them to remain parallel to each other. Decoupling of the lateral oscillatory forces from the trough is achieved by using at least two pairs of collinear springs, one of each pair on each side of a wall member secured to the trough, and each held in compression between the wall member and a pair of vibrator plates held in fixed spaced apart relationship on each side of the wall member. The imbalance generator is secured to one of the vibrator plates so as to be well outside the spring system thus giving a low natural lateral frequency to the two mass system.

4 Claims, 4 Drawing Figures

TUNED VIBRATORY FEEDERS

This invention is a continuation-in-part application of U.S. application Ser. No. 530,472 entitled Improvements in and Relating to Tuned Vibratory Feeders filed Dec. 6, 1974, now abandoned, which itself was a continuation-in-part application of U.S. application Ser. No. 308,877 entitled Improvements in and relating to Tuned Vibratory Feeders filed Nov. 22, 1972, now abandoned.

BACKGROUND OF THE INVENTION

This invention relates to vibratory feeders, conveyors, separators, screens, and other vibratory equipment used in materials handling and related fields (hereinafter referred to generally as vibrators) in which the motive force is provided by an imbalance generator of the type having unbalanced weights on a rotating shaft.

A number of methods are used to obtain a straight line motion of the driven or working member of a vibrator. One known method uses electromagnetic motors employing an electromagnet with an air gap. Part of the electromagnet is usually in the form of an "E" and is fitted with an electrical coil or coils, and the other part of the magnetic circuit is in the shape of an "I" fitted to the other part of the vibrator with an air gap between them, so that the two may vibrate relative to one another. Examples of vibrators using electromagnetic vibratory motors are described in U.S. Pat. Nos. 2,163,249; 2,654,466 and 2,694,156.

Electromagnetic vibratory motors of this electromagnetic type are restricted to vibrators having a short stroke and, since the air gap is in the direction of motion of the moving parts, is subject to drift in size and striking of the two parts of the magnetic circuit due to expansion or contraction caused by temperature variation, by fluctuations in supply voltage, or by changes in the natural frequency of vibration of the resonant system. On the other hand this type of motor does not generate forces in undesired directions which have to be decoupled.

Where larger stroke amplitudes are required in a two-mass tuned vibrator it is usual to generate the vibratory forces by an imbalance generator of the type having unbalanced weights on a rotating shaft. The shaft may be driven by any suitable means, such as a belt drive, but most commonly the shaft is part of the armature of an electric motor with eccentric weights secured to each end of the armature shaft. This imbalance generator, which constitutes one mass of the two-mass system, is coupled to the second mass, the work member, by resilient means. The second mass or work member is suitably isolated from the ground so that it may be regarded as a free mass.

The rotating unbalanced weights produce oscillatory forces which may be resolved into two components, a desired force in the direction of the desired vibratory motion, and an unwanted force at right angles thereto.

The rotational angular velocity of the imbalance generator is selected so that the desired oscillatory force has a frequency which is close to the natural frequency of the two mass system as a whole, typically 0.85 of the said natural frequency.

In order to decouple the unwanted oscillatory force from the work member the natural resonant frequency of the two mass system in the direction of the unwanted oscillatory force must be small, of the order of one quarter the frequency of the unwanted force, and this requires that the resilient coupling means have a low effective spring rate in the direction of this force.

Satisfactory decoupling has been achieved in vibrators of the above type by employing rubber or like polymer materials as the resilient means between the imbalance generator and the working member, such resilient means having different spring rates in the two directions. Rubber and polymer springs are affected by heat, oil, aging, ozone attack, and other adverse conditions, requiring frequent replacement.

Helical coil springs can be used for coupling the two masses. An arrangement of this type is described in U.S. Pat. No. 3,348,664 in which a single spring is used between the imbalance generator or motor and the working member or trough. The spring rate in the desired direction (hereinafter called the axial direction) is required to be at least twice the spring rate in the direction of the unwanted force (hereinafter called the lateral direction). In practice spring rate ratios of four or more are desirable, but it is not possible to obtain such a ratio with a helical coil spring if the spring ends are held parallel. An effective spring rate ratio of four to one can be obtained if the spring is allowed to flex in the lateral direction. However in the arrangement of U.S. Pat. No. 3,348,664, the spring is retained rigidly at its ends by clamps, resulting in the spring being subject to both tensile and compressive forces, and severe clamping strains are imposed on the ends of the spring. Any spring clamped in this way must be severely derated, since the maximum stress acts on the clamp and can be more than double the stress that the spring would be able to withstand if used entirely in compression. Frequent failure of the spring results due to stress fracturing adjacent to the mounting. Also the isolation of the vibratory movement in the lateral direction is poor, making for an elliptical motion of the working member.

A spring system for coupling the two masses has been described in U.S. Pat. No. 3,583,246 using opposingly operating pre-loaded springs which are inserted between two spring supports. It is an essential requirement of the vibrator described in this specification that the centre of gravity of the imbalance generator be at least approximately in the medial plane between the spring supports, while a characteristic of the arrangement is its small structural height, which is assisted by the use of a number of short coil springs having a few turns only. This arrangement requires that, if the spring ends are to deflect sideways with respect to each other, the spring ends must remain parallel and, while the spring ends remain parallel, a large spring rate, similar in value to the axial spring rate, is obtained. Accordingly the lateral natural frequency of this arrangement is close to the axial natural frequency, and decoupling is poor.

OBJECT AND SUMMARY OF THE INVENTION

The object of the invention is to provide a vibrator as hereinbefore defined which uses helical coil springs, in which the spring ends are not clamped and are not constrained to remain parallel, and in which the imbalance generator is positioned outside the spring system so as to provide a low natural lateral frequency for the vibrator.

According to this invention a vibrator of the tuned two mass type comprises a working member, an imbalance generator of the type having eccentric weights secured to a rotating shaft, and a spring system coupling the imbalance generator to the working member, the spring system comprising a wall member secured to the working member, two vibrator plates held in fixed spaced parallel relationship with one vibrator plate on one side of the wall member and the other vibrator plate on the other side of the wall member, at least two pairs of helical coil springs held without clamping of the spring ends between the wall member and the vibrator plates, one spring of a pair being held between said one vibrator plate and the wall member, and the other spring of a pair being held between said other vibrator plate and the wall member, the springs of a pair being collinear, the imbalance generator being secured to said one vibrator plate outside of the spring system, the vibrator having a natural axial frequency which is close to but higher than the frequency of the oscillatory forces generated by the imbalance generator, the distance by which the imbalance generator is outside the spring system being sufficient to make the natural lateral frequency of the vibrator small compared to the frequency of the oscillatory forces generated by the imbalance generator.

DESCRIPTION OF THE EMBODIMENTS

Figure 1:
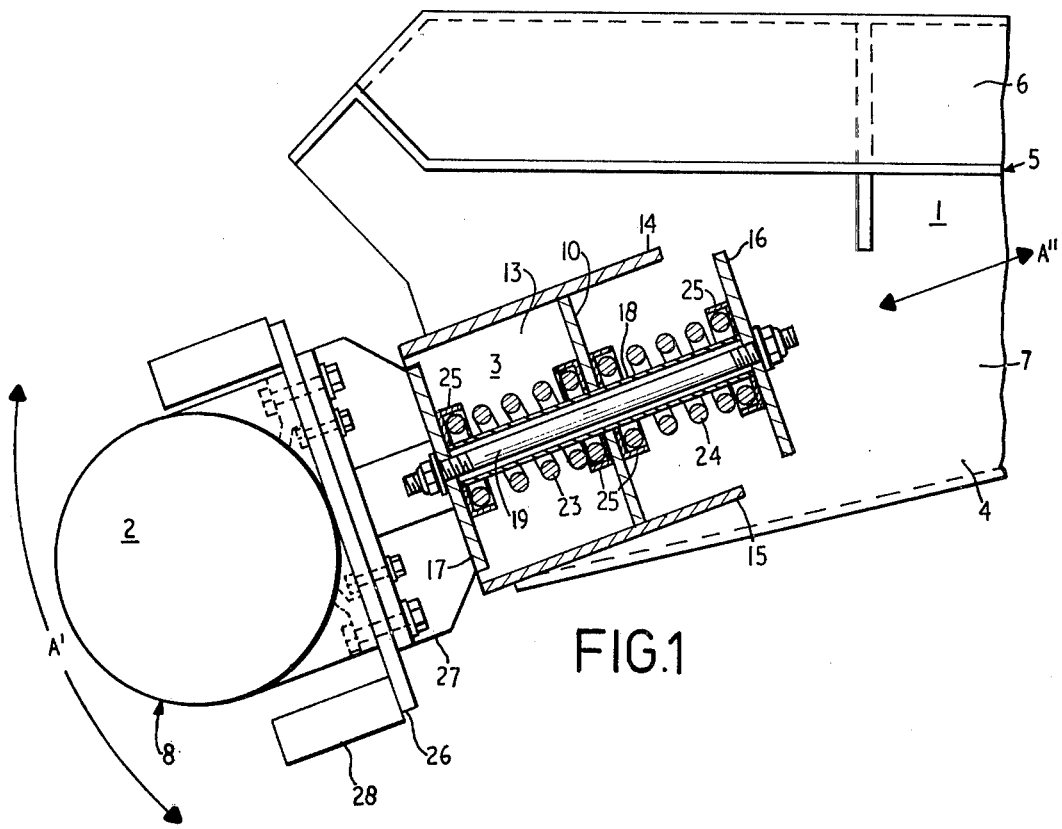
FIG. 1 is a partial longitudinal section of a vibratory feeder in accordance with this invention.
Figure 2:
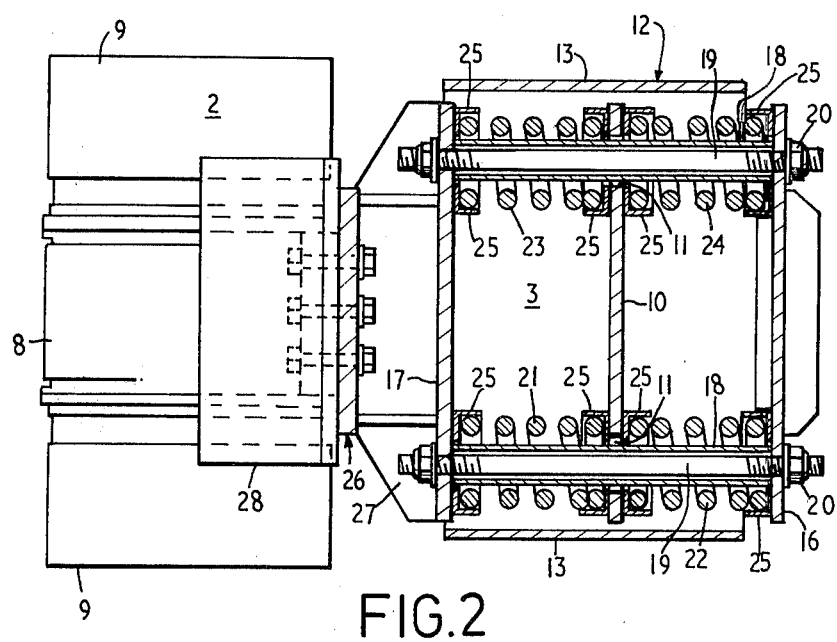
FIG. 2 is a plan view of the imbalance generator and spring system of FIG. 1 also partly in section.

Referring now to FIGS. 1 and 2, a vibratory feeder comprises a working member 1, an imbalance generator 2, and a spring system 3 coupling the imbalance generator to the working member. The working member 1 comprises a feeder trough 4 having a material pan 5. The material pan 5 has side walls 6 having portions 7 which extend downwardly and to which the spring system 3 is attached as will be described in detail hereinafter. The side walls 6 may be provided with suitable bracing means to make a rigid structure.

The imbalance generator 2 consists of a conventional rotary armature electrical motor 8 having eccentric weights secured to each end of the armature, the eccentric weights being enclosed within covers 9.

The spring system 3 is secured to the working member 1 by means of a wall member 10 having two apertures 11 therein spaced apart in a direction parallel to the armature axis. As shown these apertures are approximately opposite the eccentric weights on each end of the motor, although other spacings can be used. The wall member 10 may be secured directly between walls 7. However it is preferred that it be secured within an open-ended box like structure 12 defined by side walls 13, a top wall 14 and a bottom wall 15.

Two vibrator plates 16,17 are disposed equidistantly each side of the wall member 10 and are held in fixed parallel relationship by means of spacer tubes 18 and tie bolts 19 which pass axially through the spacer tubes. The spacer tubes pass through the apertures 11 with clearance for a purpose to be described. Nuts 20 are tightened on each end of the tie bolts.

Two pairs of springs 21,22 and 23,24 are held between the wall member 10 and the vibrator plates 16,17 under a pre-selected amount of compression. The spring 21 is held between the wall-member 10 and the vibrator plate 17, and the spring 22 between the wall member 10 and the vibrator plate 16. The springs 21,22 surround and are coaxial with the spacer tube 18. Preferably the ends of each spring are located in retainer cups 25 carried on the respective adjacent faces of the members 10,16,17 to prevent chafing between the spring ends and adjacent surfaces. Springs 23,24 are held between the wall-member 10 and the vibrator plates 17,16 in a similar manner. Rotation of the springs may be prevented if required by cementing the spring ends in their respective cups by an epoxy resin or the like material.

The imbalance generator is secured to the vibrator plate 17 by means of a mount 26 bolted to flanges 27 on vibrator plate 17.

The axial component in the direction A" of the oscillatory forces provided by the imbalance generator are transferred directly to the wall member 10 by means of the pairs of springs. The relative masses and the spring rates, and the rotational frequency of the imbalance generator 2, are selected so that the frequency of the oscillatory axial force provided by the imbalance generator is close to but below the natural frequency of the two mass tuned system constituted by working member 1, imbalance generator 2 and spring system 3.

The lateral oscillatory forces generated by the imbalance generator 2 will tend to cause the imbalance generator to oscillate as shown by the arrow A' with the centre of oscillation at the wall member 10. The apertures 11 are of sufficient size to allow this motion without the wall member 10 fouling against the spacer tubes. The springs 21,22,23,24 are subject to compressive stresses and not tension stresses, their ends are not constrained to remain parallel, and the ends are not held by clamps. They therefore do not need to be derated and have a long life. The mass of the imbalance generator is located well away from the centre of oscillation at wall member 10, and this, together with the low effective lateral rate of the springs in bending, makes the lateral frequency of the mass-spring system low in relation to the frequency of the oscillatory forces generated by the imbalance generator. The lateral forces are, therefore, effectively decoupled from the working member 1.

The distance of the imbalance generator 2 from the wall member 10 can be increased to any desired extent by merely increasing the height of the flange 27. Additional masses 28 may be attached to the motor mount 26 if desired.

For larger machines additional pairs of springs can be held between the wall member 10 and vibrator plates 16,17 in the line defined by the springs 21,22,23,24.

Figure 3:
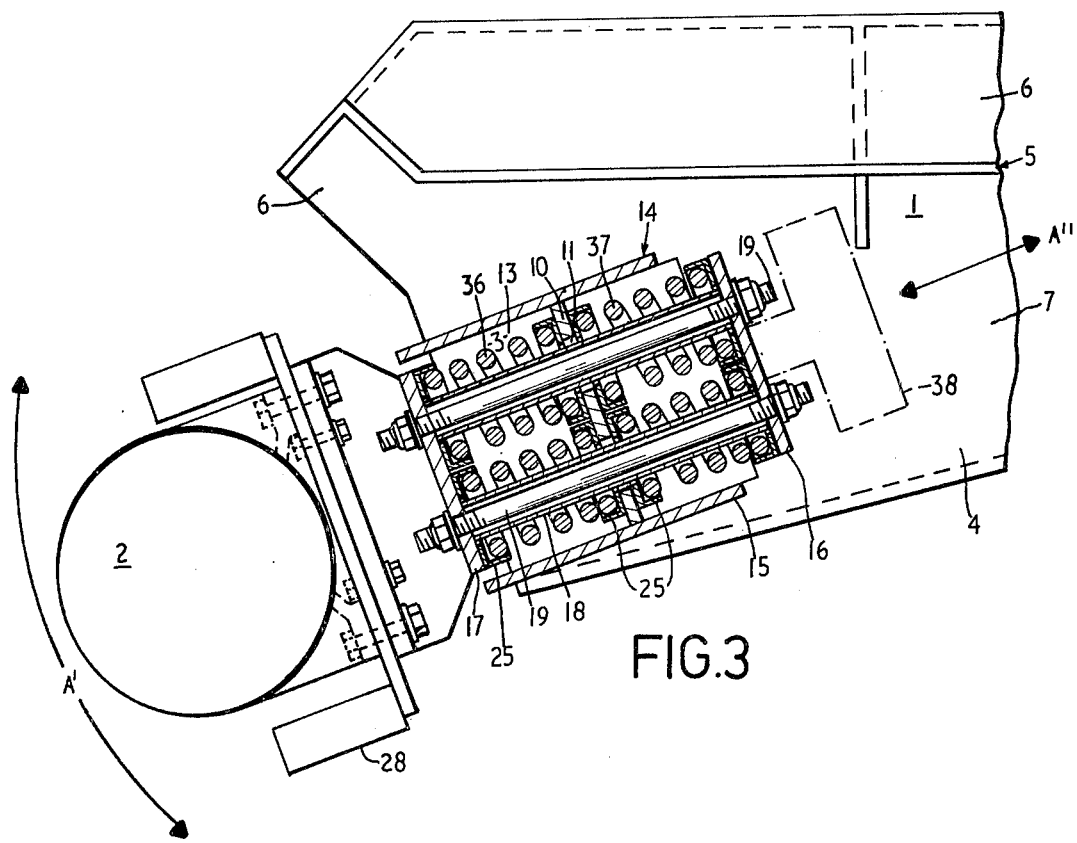
FIG. 3 is a partial longitudinal section of a modification of FIG. 1 for use where larger powers are involved.
Figure 4:
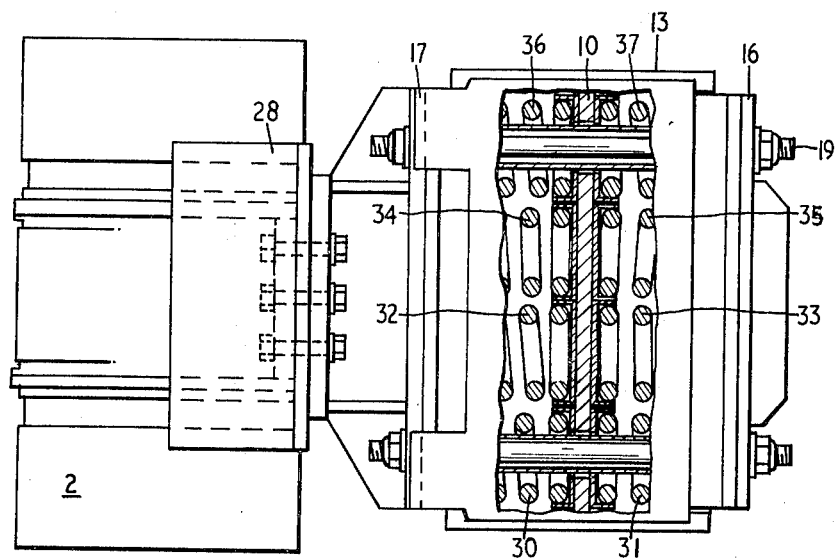
FIG. 4 is a plan view, similar to FIG. 2, of the embodiment of FIG. 3.

A modified spring arrangement is shown in FIGS. 3 and 4 where still greater powers are to be handled. Two rows of pairs of springs are used, the rows being closely spaced, and with the centre line between them, which is along the line A", in line with the axis of rotation of the imbalance generator. Each row consists of four pairs of springs, of which the top row is visible in FIG. 4. The pairs of springs are 30,31;32,33;34,35 and 36,37. Only the outer pairs of springs in each row, for example pairs 30,31 and 36,37 in the upper row, surround spacer tubes — the other springs are located only by their retaining cups.

A further mass 38 may be secured to the vibrator plate 16 to modify the characteristics of the assembly. This mass 38 should be smaller than the mass 28 if used.

What we claim is:

1. A vibrator of the tuned two mass type comprising a working member, an imbalance generator of the type having eccentric weights secured to a rotating shaft, and a spring system coupling the imbalance generator to the working member, the spring system comprising a wall member secured to the working member, two vibrator plates held in fixed spaced parallel relationship with one vibrator plate on one side of the wall member and the other vibrator plate on the other side of the wall member, at least two pairs of helical coil springs held without clamping of the spring ends between the wall member and the vibrator plates, one spring of a pair being held between said one vibrator plate and the wall member, and the other spring of a pair being held between said other vibrator plate and the wall member, the springs of a pair being collinear, the imbalance generator being secured to said one vibrator plate outside of the spring system, the vibrator having a natural axial frequency which is close to but higher than the frequency of the oscillatory forces generated by the imbalance generator, the distance by which the imbalance generator is outside the spring system being sufficient to make the natural lateral frequency of the vibrator small compared to the frequency of the oscillatory forces generated by the imbalance generator.

2. A vibrator as claimed in claim 1 wherein two spaced apertures are provided in the wall member, the means for holding the vibrator plates apart in fixed parallel relationship are two cylindrical spacers extending through the apertures with clearance, and each pair of springs is coaxial with a respective one of the spacers.

3. A vibrator of the tuned two mass type comprising a working member, an imbalance generator of the type having eccentric weights secured to a rotating shaft, and a spring system coupling the imbalance generator to the working member, the spring system comprising a wall member secured to the working member, two vibrator plates held in fixed spaced parallel relationship with one vibrator plate on one side of the wall member and the other vibrator plate on the other side of the wall member, two rows of pairs of helical coil springs held without clamping of the spring ends between the wall member and the vibrator plates, the rows being closely adjacent, one spring of each pair being held between said one vibrator plate and the wall member, and the other spring of each pair being held between said other vibrator plate and the wall member, the springs of each pair being collinear, the said imbalance generator being secured to said one vibrator plate outside the spring system with the rotational axis of the imbalance generator parallel to the rows of coil springs and with its axial line of action between the two rows, the vibrator having a natural axial frequency which is close to but higher than the frequency of the oscillatory forces generated by the imbalance generator, and the distance by which the imbalance generator is outside the spring system being sufficient to make the natural lateral frequency of the vibrator small compared to the frequency of the oscillatory forces generated by the imbalance generator.

4. A vibrator as claimed in claim 3 wherein four apertures are provided in the wall member, one aperture at each end of each row, the means for holding the vibrator plates apart in fixed parallel relationship are four cylindrical spacers extending through a respective aperture with clearance, and each end pair of springs is co-axial with a respective one of the spacers.

* * * * *